United States Patent [19]

Brehmer et al.

[11] Patent Number: 4,717,496

[45] Date of Patent: Jan. 5, 1988

[54] STIFFENING MATERIAL WITH MELT-ADHESIVE PROPERTIES

[75] Inventors: Harald Brehmer, Neuhofen; Emil Wilding, Birkenheide, both of Fed. Rep. of Germany

[73] Assignee: Giulini Chemie GmbH, Ludwigshafen, Fed. Rep. of Germany

[21] Appl. No.: 708,059

[22] Filed: Mar. 4, 1985

Related U.S. Application Data

[63] Continuation-in-part of Ser. No. 677,296, Dec. 3, 1984, abandoned.

[51] Int. Cl.$^4$ .............. C08K 9/10; C08L 23/08; C08L 67/04; C08L 75/04
[52] U.S. Cl. .................... 525/129; 523/167; 523/201; 523/206; 525/127; 525/130; 525/131; 525/186; 525/222; 525/233; 525/239; 525/240
[58] Field of Search .............. 523/167, 209, 206, 201; 525/186, 131, 129, 127, 130, 222, 233, 239, 240; 524/904; 428/407, 402, 403

[56] References Cited

U.S. PATENT DOCUMENTS

| | | | |
|---|---|---|---|
| 3,518,221 | 6/1970 | Kenyon et al. | 523/209 |
| 3,764,456 | 10/1973 | Woodhams | 523/209 |
| 3,773,708 | 11/1973 | Takahashi et al. | 523/209 |
| 3,778,251 | 12/1973 | Trask | 117/68 |
| 3,956,230 | 5/1976 | Gaylord | 523/206 |
| 4,124,562 | 11/1978 | Yol et al. | 523/209 |
| 4,151,155 | 4/1979 | Chaplick | 523/167 |
| 4,211,691 | 7/1980 | Fitzgeral et al. | 524/904 |
| 4,273,919 | 6/1981 | Feldmann et al. | 524/904 |
| 4,433,073 | 2/1984 | Sano et al. | 523/206 |
| 4,478,963 | 10/1984 | McGarry | 523/206 |
| 4,480,057 | 10/1984 | Sano | 523/206 |

FOREIGN PATENT DOCUMENTS

| | | | |
|---|---|---|---|
| 1027838 | 3/1978 | Canada | 154/140 |
| 2621195 | 11/1977 | Fed. Rep. of Germany | |

OTHER PUBLICATIONS

Kunststoff-Lexikon, Beck et al, eds., definition of "Polyphenylenoxid", p. 303, Carl Hauser Verlag, Munich (1973).

Primary Examiner—Allan M. Lieberman
Attorney, Agent, or Firm—Spencer & Frank

[57] ABSTRACT

A stiffening material composed of 30 to 80 weight percent filler particles and 70 to 20 weight percent binder which is thermoplastically deformable and has melt-adhesive properties in the temperature range of 50° to 80° C., wherein the filler particles are plastic particles or particles having plastic surfaces with a particle size distribution of 50 to 500 microns.

11 Claims, No Drawings

STIFFENING MATERIAL WITH MELT-ADHESIVE PROPERTIES

This application is a continuation-in-part application of co-pending U.S. Ser. No. 677,296, filed Dec. 3, 1984) now abandoned.

BACKGROUND OF THE INVENTION

The present invention relates to a novel stiffening material having melt-adhesive properties, particularly for shoe parts, and to a method for producing such a material.

Thermoplastic stiffening materials are known; they have been used in the shoe industry for a long time. Advisably they are produced in sheet forms and are used in pieces cut therefrom to stiffen the heel region and possibly also the toe region of shoes. The cut pieces can be deformed under the influence of heat, with the stiffening material having to have such properties that, after deformation and cooling, the molded piece will assuredly retain its shape and have good flexibility.

Moreover, the stiffening materials may be coated on one or both sides with thermoplastic adhesives to that during or after deformation they may also be heat sealed to the upper and/or lining material of the shoe.

As is known, thermoplastic stiffening materials may be produced in various ways, e.g. by spreading the coating materials in the form of a dispersion, solution or melt onto woven or knitted or nonwoven textile fabrics. Stiffening sheets may also be produced by laminating thin sheets onto fabric substrates, and most recently also by extrusion of suitable thermoplastic materials.

German Pat. No. 2,621,195 discloses stiffening materials which are produced by melting powdered mixtures of plastics (binders) and fillers onto woven or nonwoven textile fabrics. It is significant for the production process that the powdered fillers are present in a particle size distribution which is comparable to the particle size distribution of the plastic powder, with the particle size distributions in each case lying between 50 and 500 microns, preferably between 100 and 400 microns. If these parameters are maintained, the filler may be used in quantities up to 100 volume percent with respect to the volume of the plastic powder, without this making the melting together of the plastic particles more difficult or impossible.

Although stiffening materials according to German Pat. No. 2,621,195 can still be deformed in a temperature range from 50° to 80° C., they cannot be heat sealed to the upper or lining material without first being provided on one or both sides with an adhesive layer, for example a hot melting adhesive, which today is considered to be a drawback.

SUMMARY OF THE INVENTION

It is an object of the present invention to provide a stiffening material which is deformable and can be heat sealed directly in the processing range, which in the shoe industry lies at about 50° to 80° C.

Surprisingly, this can be accomplished with a stiffening material composed of 30 to 80 weight percent filler and 70 to 20 weight percent binder, wherein the filler particles are plastic particles or, at least, particles having plastic surfaces, with a particle size distribution of 50 to 500 microns, preferably 100 to 400 microns, and the binder is thermoplasticly deformable in a temperature range of about 50° to 80° C. and has melt-adhesive properties. According to a particularly advantageous embodiment of the invention, the filler component is present in the mixture in an amount of 40 to 60 weight percent and the binder component is present in an amount of 60 to 40 weight percent.

DETAILED DESCRIPTION OF THE EMBODIMENTS

Only those materials are used as binders which are thermally deformable in a temperature range of about 50° to 80° C. and are also melt-adhesives. Such binders are commercially available but have so far not been used as stiffening materials in the shoe industry. Preferred materials are polymerizates and copolymerizates of cyclic esters as well as mixtures of these polymerizates. Polymerizates of cyclic esters are disclosed, inter alia, in U.S. Pat. No. 3,778,251 and in Canadian Pat. No. 1,027,838. In both patents, the substances are used on one or both sides as adhesive films on customary stiffening materials, for example on such materials made of styrene-butadiene copolymerizates and of copolymerizates of vinyl chloride and an alpha-olefin, and they may be modified with viscosity enhancers, fillers and other additives.

The deformation temperature of the binders used according to the present invention likewise is in a temperature range of 50° to 80° C. For polyepsilon caprolactone, for example, the deformation temperature is 60° C.

Other suitable binders are elastomer polyurethanes as well as modified polyolefins, e.g. polyethylene vinyl acetate. Ionomers can also be used as binders.

The binder which causes adhesion of the filler particles during manufacture of the stiffening material as well as the later adhesion to the shoe parts, is preferably polyepsilon caprolactone, which can be used in powder form as well as in granulated form. If it is used in powder form, then it should have a particle size distribution between 50 and 500 microns, particularly between 100 and 400 microns, i.e. a distribution comparable to the particle size distribution of the filler powder.

In the novel stiffening material, the filler particles are made of plastic, particularly waste plastic. For example, high impact rigid PVC particles and copolymerizates of vinyl chloride and an alpha olefin or of styrene and butadiene or acrylonitril, butadiene and styrene, are particularly suitable.

In summary, it can be stated at this point, that the plastics used as fillers according to the present invention are essentially those which, due to their melting properties, cannot be processed alone, or only with difficulty, according to processes of the powder technology to form areal structures.

Conventional inorganic fillers may also be used, if they are coated with a plastic layer according to the above definition. Such inorganic or organic fillers may be, for example: calcium carbonate, kaolin, quartz meal, wood or cork meal. In addition to these fillers, the composition may include dye pigments, anti-static agents, adjuvants and other conventional additives.

The noveal stiffening material may be produced according to various methods, e.g. according to methods known in the powder processing art, by casting, screen printing, molding resp.flow-molding or extrusion. The powder mixture may also be melted onto one or both sides of a substrate material, for example onto woven or nonwoven textile fabrics or onto shoe parts. Adhesion to the substrate material may be conducted during extrusion. The powder mixture can be heated by any energy known in the art, e.g. by radiant heat, infrared heating, high-frequency heating (radio heat), microwave-heating and magnetic induction-heating.

One absolute prerequisite of the present invention is that the filler particles must not dissolve in the binder during the melting process, but remain in the form of essentially discrete bodies, as do the inorganic fillers. Only then can the favorable characteristics of the binder be retained. Moreover, the binder must firmly adhere to the filler. Slight surface dissolution or softening of the filler particles in the melt, however, will not be avoidable in every case, and will not detract from the overall characteristics of the invention.

The advantage of the novel stiffening material is seen primarily in the fact that it adheres to any desired cut surface, since it is composed of a multitude of particles which are covered by a melt-adhesive. Accordingly, each particle acts as a unitary stiffening material with a surface having melt-adhesive properties. The processing process is thus simplified considerably, e.g., it is no longer necessary to subsequently provide a mechanically thinned (skived) stiffening material with an adhesive.

Type, shape and quantity of the filler particles can greatly influence the characteristics of the end product, particularly its stiffness and its viscosity when heated. By adding the filler particles, viscosity and stiffness of the end product can be greatly increased so that the binder will be prevented from flowing during thermoplastic deformation. The physical characteristics of the end product, however, are greatly influenced by the shape of the particles as well as by the quantity of the filler. For example, it has been found that plate-shaped (flat) particles are particularly effective in increasing viscosity.

The present invention will now be described in greater detail with the aid of the following examples.

EXAMPLE 1

Waste pieces of thin sheets of an high impact rigid PVC were ground in a suitable comminution system and processed and classified such that the edge lengths of the selected particles were between 100 and 400 microns. High molecular weight polycaprolactone of the formula

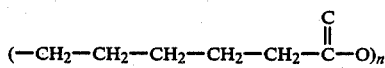

and having a molecular weight of 40,000 [Union Carbide PCL 700] was similarly comminuted to a particle size of 100 to 400 microns.

500 parts by weight PCL 700 were then mixed with 500 parts by weight hard PVC powder in a suitable powder mixer. On a roller spreader, a plain weave (1:1) cotton fabric weighing 60 g/m$^2$ was then covered with 700 g/m$^2$ of the powder mixture. A subsequent heat treatment was conducted in an infrared field, in which the powder mixture was heated to about 150° C. The fabric panel remained in the infrared apparatus until the PCL 700 was completely melted. In the plastic state, the panel was then brought through a cold smoothing calender and, after cooling, was rolled onto a reel.

EXAMPLE b 2

Regenerated acrylonitril-butadiene-styrene copolymerizated granules [Novodur KL 1-520 made by Bayer AG] were ground in a comminuton system to a particle size distribution between 100 and 500 microns (0.1 to 0.5 m). This powder was mixed, as in Example 1, with ground PCL 700, but instead of 50 weight percent, 60 weight percent PCL 700 was used.

A negative silicone mold provided for the manufacture of heel reinforcements in shoes was filled with the mixture. The silicone mold was of such configuration that heel reinforcements was formed which taper toward the lateral and upper edges to almost 0.01 mm.

The mold filled with the powder was heated under pressure for 20 seconds with the aid of a high frequency generator (40,000 MHz/40 KW/h) and then cooled for 20 seconds. After cooling, the ready-for-use shoe stiffener was removed from the silicone mold.

EXAMPLE 3

In an extrusion system, the powder mixture of Example 1 was plasticized in such a manner that only the PCL 700 was liquefied. Upon leaving the sheet die, the temperature of the melt was about 100° C., and the sheet had a thickness of 0.9 mm. After cooling, the sheet was rolled onto a reel.

EXAMPLE 4

On a continuously operating kneading machine, suitable for the addition of a plurality of components in different process stages, PCL 700 was introduced in its supplied form (granulate) as the first component. After heating, the PCL melted at 140° C. Shortly before reaching the extrusion tool, in the last kneading zone, the melt was carefully mixed with 40 weight percent ground acrylonitril-butadiene-styrene copolymerizate without the filler being dissolved or further comminuted. The particle size distribution of the filler was between 100 and 500 microns (0.1 to 0.5 mm). Then the melt was extruded as in Example 3 and rolled onto a reel.

EXAMPLE 5

As in Example 4, a mixture of PCL 700 and acrylonitril-butadiene styrene copolymerizable was produced, but the melt was discharged in charges and, in a still deformable state, was pressed into a cooled mold or a plurality of molds. At the end, the molded body was taken out of the mold.

EXAMPLE 6

A melt-adhesive, composed of 65 weight percent PCL 700, 21 weight percent phenol resin (SP-560, made by Schenectady Chemical Inc.) having a melting point of 150° C. and a density of 1.10 at 25° C. 10 weight percent EVA [ethylene vinyl acetate] and 4 weight percent microcrystalline wax were ground in a comminuting system to a particle size of from 100 to 400 microns. Thereafter, 500 parts by weight of the melt-adhesive (binder) and 500 parts by weight hard PVC powder having a particle size of from 100 to 400 microns were mixed in a powder mixer. The powder mixture was processed further, as in Example 1, on a roller spreader machine.

EXAMPLE 7

Regenerated acrylonitril-butadiene-styrene copolymerizate granules (Novodur KL 1-5202 made by Bayer AG) were ground in a comminution system to a particle size dustribution between 100 and 500 microns (0.1 to 0.5 mm). This powder was mixed, as in Example 1, with ground PCL 700, but instead of 50 weight percent, 60 weight percent PCL 700 was used. A silicone mold, provided for the manufacture of heel reinforcements in shoes was filled with the mixture using screen printing technology. The silicone mold was of such configuration that heel reinforcements was formed which taper toward the lateral and upper edges to almost 0.01 mm.

The mold filled with the powder was heated for 20 seconds with the aid of a high frequency generator (40,000 MHz/40 KW/h) and then cooled for 20 seconds. After cooling, the ready-for-use shoe stiffener was removed from the silicone mold.

It will be understood that the above description of the present invention is susceptible to various modifications, changes and adaptations, and the same are intended to be comprehended within the meaning and scope of equivalents of the appended claims.

We claim:

1. A stiffening material composed of filler and binder and produced by melting the binder, shaping a composition which includes filler and binder, and then cooling the shaped composition, said stiffening material comprising 30 to 80 weight percent filler and 70 to 20 weight percent binder, wherein the filler consists of at least one type of particle selected from the group consisting of plastic particles, organic filler particles coated with at least one plastic surface layer, and inorganic filler particles coated with at least one plastic surface layer, said particles being present in a particle size distribution of from 50 to 500 microns, the plastic comprising the plastic particles or the surface layer of the coated filler particles being selected such that it will not dissolve in the binder at temperatures of about 50° C. to 80° C. but the particles remain in the form of essentially discrete bodies, wherein the binder firmly adheres to the filler particles; and wherein the binder is thermoplasticly deformable in a temperature range of about 50° C. to 80° C. and has melt-adhesive characteristics.

2. The stiffening material of claim 1, wherein the filler particles are present in a particle size distribution of from 100 to 400 microns.

3. The stiffening material of claim 1, wherein the binder is a polymer of a cyclic ester or a copolymer of a cyclic ester.

4. The stiffening material of claim 3, wherein the binder is polyepsilon caprolactone.

5. The stiffening material of claim 1, wherein the binder is an elastomeric polyurethane.

6. The stiffening material of claim 1, wherein the binder is an olefin copolymer.

7. The stiffening material of claim 6, wherein the binder is an ethylene-vinyl acetate copolymer.

8. The stiffening material of claim 1, wherein the filler is high impact rigid PVC.

9. The stiffening material of claim 1, wherein the filler is a copolymer of acrylonitril, butadiene and styrene.

10. The stiffening material of claim 1, wherein the filler is a copolymer of vinyl chloride and an alpha olefin.

11. The stiffening material of claim 1, wherein the filler is present in the amount of 40 to 60 weight percent and the binder is present in the amount of 60 to 40 weight percent.

* * * * *